US007007091B2

(12) United States Patent
Inada et al.

(10) Patent No.: US 7,007,091 B2
(45) Date of Patent: Feb. 28, 2006

(54) METHOD AND APPARATUS FOR PROCESSING SUBJECT NAME INCLUDED IN PERSONAL CERTIFICATE

(75) Inventors: Ryu Inada, Kawasaki (JP); Masato Kurosaki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 430 days.

(21) Appl. No.: 09/987,418

(22) Filed: Nov. 14, 2001

(65) Prior Publication Data
US 2002/0059437 A1    May 16, 2002

(30) Foreign Application Priority Data
Nov. 16, 2000  (JP)  .............................. 2000-350185
Oct. 12, 2001  (JP)  .............................. 2001-315276

(51) Int. Cl.
*G06F 15/173*    (2006.01)
(52) U.S. Cl. ...................................... 709/226; 715/511
(58) Field of Classification Search ................ 709/226, 709/227, 203–205, 223, 225, 229; 713/200, 713/176, 165, 201, 154, 166; 711/121, 150, 711/118, 174; 715/751, 513, 716; 726/202
See application file for complete search history.

(56) References Cited

U.S. PATENT DOCUMENTS

| | | | | |
|---|---|---|---|---|
| 5,606,617 A | * | 2/1997 | Brands ......................... | 380/30 |
| 5,781,725 A | * | 7/1998 | Saito .......................... | 713/201 |
| 5,787,175 A | * | 7/1998 | Carter ......................... | 713/165 |
| 5,884,312 A | * | 3/1999 | Dustan et al. ................ | 707/10 |
| 5,922,074 A | * | 7/1999 | Richard et al. ............. | 713/200 |
| 5,923,756 A | * | 7/1999 | Shambroom ................ | 713/156 |
| 6,052,785 A | * | 4/2000 | Lin et al. .................... | 713/201 |
| 6,088,805 A | * | 7/2000 | Davis et al. ................ | 713/202 |
| 6,189,103 B1 | * | 2/2001 | Nevarez et al. ............. | 713/201 |
| 6,198,824 B1 | * | 3/2001 | Shambroom ................ | 380/279 |
| 6,209,095 B1 | * | 3/2001 | Anderson et al. ........... | 713/176 |
| 6,367,009 B1 | * | 4/2002 | Davis et al. ................ | 713/166 |
| 6,377,992 B1 | * | 4/2002 | Plaza Fernandez et al. . | 709/227 |
| 6,385,596 B1 | * | 5/2002 | Wiser et al. ................. | 705/51 |
| 6,425,011 B1 | * | 7/2002 | Otani et al. ................. | 709/225 |
| 6,463,535 B1 | * | 10/2002 | Drews ........................ | 713/176 |
| 6,490,624 B1 | * | 12/2002 | Sampson et al. ........... | 709/227 |
| 6,564,320 B1 | * | 5/2003 | de Silva et al. ............ | 713/156 |
| 6,675,261 B1 | * | 1/2004 | Shandony ................... | 711/121 |
| 6,704,867 B1 | * | 3/2004 | Cordery ...................... | 713/165 |
| 6,789,194 B1 | * | 9/2004 | Lapstun et al. ............. | 713/176 |

(Continued)

OTHER PUBLICATIONS

Auth Broker (First Draft); www.columbia.edu/acis/rad/authmethods/histroy/columbia-auth-overview.html.*

(Continued)

*Primary Examiner*—Thong Vu
(74) *Attorney, Agent, or Firm*—Oliff & Berridge, PLC

(57) ABSTRACT

A subject name of a personal certificate is used to easily perform access control. An authentication unit implements an authentication procedure between a client terminal and a web server. The authentication unit receives a certificate from the client terminal for executing the authentication procedure, and its subject name is supplied to an element extracting unit. The element extracting unit follows a hierarchy structure of the subject name to extract a predetermined element. A right determining unit determines an access right for accessing a document based on a type and a value of the element extracted, and allocates this to a session number. A right registering unit registers a relation between the session number and the access right. Thereafter, while the session continues, an access right is allowed based on the session number.

22 Claims, 9 Drawing Sheets

U.S. PATENT DOCUMENTS

| | | | |
|---|---|---|---|
| 6,801,999 B1 * | 10/2004 | Venkatesan et al. | 713/167 |
| 6,839,879 B1 * | 1/2005 | Hwang | 715/511 |
| 6,865,671 B1 * | 3/2005 | Assmann | 713/154 |
| 6,898,706 B1 * | 5/2005 | Venkatesan et al. | 713/167 |
| 2002/0010679 A1 * | 1/2002 | Felsher | 705/51 |

OTHER PUBLICATIONS

Overview of Class Twelve—Apache, Squid, Cgiwrap . . . & Rdist; bigworm.colorado.edu/Saclass/class12.html.* www.freeware4sun.com/patches/README/106754-01. README; www.freeware4sun.com/patches/README/106754-01.README.*

Apache-SSL: Certificates, Configuration and More; ist.uwaterloo.ca/security/lib-proxy/howto/ssleay/apache.html.*

S/MIME version 2 Certificate Handling. RFC 2312; www.tzi.de/~cabo/pdfrfc/rfc2312.txt.pdf.*

Technote 1175—;developer.apple.com/technotes/tn/pdf/tn1175.pdf.*

Privacy Enhancement for Internet Electronic Mail: Part IV: Key . . . —Kaliski (1993); ftp.cert.dfn.de/pub/tools/crypt/secude/Security/pem/rfc1424.ps.*

White Paper : Cisco System Simple Certificate Enrollment protocol www.cisco.com/warp/public/cc/pd/sqsw/tech/scep_wp.pdf.*

A Customizable mechanism fro generating an X.500 Distinguished Nmae, when a client has not presented an X.509 ceritificate. IBM Aug. 2001.*

Learning User Interests Across Heterogeneous Document Databases—Krulwich (1995) venera.isi.edu/sims/sss95/krulwich.ps.Z.*

Valid Time Integrity Constraints—Böhlen (1994) ; ftp.cs.arizona.edu/timecenter/ChronoLog/tr94-30.ps.*

Using Trusted Third Parties for Secure Telemedical . . . —Katsikas, al. (1998) softlab.icsd.aegean.gr/~dspin/pubs/jrnl/1998-IJMI-ETS/html/euromed.pdf.*

Grid Computing on the Web Using the Globus Toolkit—Aloisio, Cafaro, Falabella, . . . www.informatica.unile.it/laboratori/lab-hpc/papers/hpcn2k.ps.gz.*

Efficient and Fresh Certification—Gassko, Gemmell, MacKenzie (2000) www.bell-labs.com/user/philmac/././research/cert-pkcfinal.ps.gz.*

* cited by examiner

FIG. 3

CERTIFICATE INFORMATION

| CERTIFICATE ID | SUBJECT NAME | CERTIFICATE'S EXPIRATION DATE | PUBLIC KEY |
|---|---|---|---|
| 00002 | JP, XYZ, Partner, Xnetproject, ABC, 12345 001 Taro Yamada | 2000/12/31 | |

FIG. 7

| PROJECT | OPERATION TYPE OR PURPOSE CODE | FILE NAME/DIRECTORY NAME |
|---|---|---|
|  |  |  |

FIG. 8

| SESSION NUMBER | RIGHT (ACCESSIBLE FILE NAME/DIRECTORY NAME) |
|---|---|
|  |  |

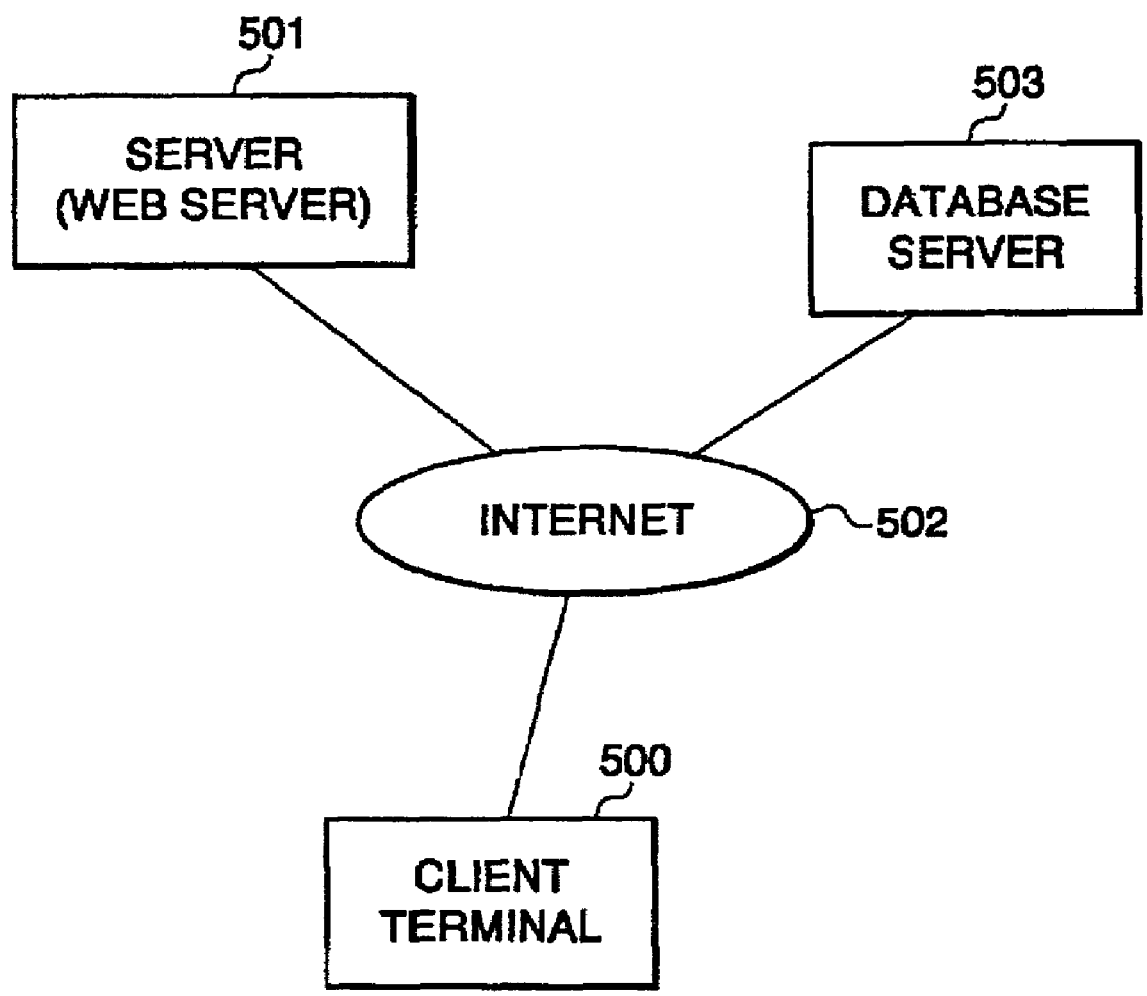

METHOD AND APPARATUS FOR PROCESSING SUBJECT NAME INCLUDED IN PERSONAL CERTIFICATE

BACKGROUND OF THE INVENTION

1. Field of the Invention

The present invention relates to a technique for controlling access using a subject name in a personal certificate (hereinafter, referred to simply as a certificate).

2. Description of the Related Art

ITU-T recommendation X.509 defines directory model authentication. A personal certificate in conformity with the directory model authentication is issued from the certificate issuing authority (the certifying authority). The certificate issuing authority receives, from an applicant, information (name, belonging, public key, and so on) needed to issue a certificate, and issues the certificate in accordance with a predetermined policy, thereby storing the certificate into a predetermined certificate storing unit. The applicant can take out the certificate from the certificate storing unit.

When the subject name included in a personal certificate is only seen, it is unclear what right or properties the holder of the certificate has. Various approaches have been employed in order to recognize the right or properties the holder has. For example, the subject name and the right of the certificate are registered into a database, which are inquired to the database for each access using the certificate. The method, however, has the problem of efficiency.

FIG. 10 shows a system example for implementing the abovementioned related art approach. In the figure, the user uses a client terminal 500 to access a web server 502 via a network (e.g., the Internet) 501. The access is performed using the SSL method. A certificate is transmitted from the client terminal 500 to the web server 502 for authentication. Thereafter, the data is encrypted by a symmetric key decided by negotiations, which is then sent/received. The web server 502 uses the subject name in the certificate (an identifier of the authenticated person described in the certificate) sent from the client terminal 500 to make an inquiry to a database server (a directory service) 503, and then, recognizes whether the user of the client terminal 500 has an access right or not. For example, an authorized level of access right for accessing an object (e.g., 0, 1, 2, and so on) and a subject name as an argument are inquired to the database server 503, and a response whether the user with the subject name is of the authorized access right level is received. The database server 503 stores the relation between the user (the subject name) and the authorized access right level. An authorized access right level with a subject name as an argument may be received so that the web server 502 side determines whether an accessed file is within the authorized access right level. Alternatively, a subject name and an accessed file name (a directory name) may be transmitted to the database server 503 for checking.

In the abovementioned related art approach, the access right is checked to the database server 503 via the network 501 for each access, thus increasing the load on the computer. In addition, since the checked data is sent directly to the network 501, there occurs a security problem.

To avoid the foregoing problems, a copy of a set or subset of the access right information of the database server 503 may be locally placed on a site of the web server 500. However, the consistency between the database server 503 and the copy must be maintained and the maintenance management is complicated. Besides, placing the database server on each site will increase the cost.

SUMMARY OF THE INVENTION

The present invention has been made in view of the above circumstances and provides a technique which can instantly recognize the right or properties from the subject name in a certificate and easily perform access control using this.

According to an aspect of the present invention, an apparatus for processing a subject name included in a personal certificate has: a part that receives a personal certificate; a part that verifies the received personal certificate based on a digital signature technique; a part that extracts at least one predetermined element in a hierarchy of a subject name included in the received personal certificate; and a part that determines an access right of the holder of the personal certificate based on a value of the predetermined element when the verification is successful.

In the configuration, a personal certificate is verified to check the legitimacy of the element of its subject name, so that an access right can be determined based on the legitimate element value. Thereby it is unnecessary to access the database such as the directory service.

According to another aspect of the present invention, a web server computer system has: a part that receives a personal certificate; a part that verifies the received personal certificate based on a digital signature technique; a part that extracts at least one predetermined element in a hierarchy of a subject name included in the received personal certificate; and a part that determines an access right of a holder of the personal certificate based on the predetermined element value when the received personal certificate is successfully verified.

Also in the configuration, an access right can be easily distinguished without using the database such as the directory service.

The web server computer system may have only a web server, or have a web server and an application server. Various functions to discriminate an access right are implemented by a web server's authenticating function, a CGI (Common Gateway Interface) program, and an application server.

According to a further aspect of the present invention, an apparatus for processing a subject name included in a personal certificate receives a personal certificate in which a predetermined element of a subject name represents an organization to which a holder of the personal certificate belongs and an attribute other than a personal ID so as to process the subject name. The apparatus has: a part that receives the personal certificate; a part that extracts a predetermined element in a hierarchy of a subject name included in the received personal certificate; and a part that decides an access right based on an organization to which a holder of the personal certificate belongs and an attribute other than a personal ID represented by a value of the predetermined element.

In the configuration, an access right can be easily determined without using the database such as the directory service. In particular, the organizational unit name in the subject name is used to flexibly define access right information.

The present invention can be implemented not only as an apparatus or system but also as a method. In addition, part of such a method may be implemented as a computer program and stored in a storage medium.

BRIEF DESCRIPTION OF THE DRAWINGS

FIG. 3 is a diagram explaining a certificate database of the embodiment;

FIG. 7 is a diagram explaining an example of a table defining the access right distinction of the embodiment;

FIG. 8 is a diagram explaining session management of the embodiment;

FIG. 10 is a diagram explaining a related art.

DETAILED DESCRIPTION OF THE PREFERRED EMBODIMENT

An embodiment in which the present invention is applied to an information access system will be described hereinbelow. This embodiment assumes that a managing company and cooperating companies cooperatively conduct business to achieve a predetermined project. Employees of the managing company and the cooperating company can access information held by the managing company. A personal certificate is used for accessing the information. The managing company is a company (a business entity) taking an initiative to issue a personal certificate. The present invention may be applied not only under such an environment but also under various environments to determine an access right when accessing information. The present invention can also be applied under an environment in which an official certifying authority, not the abovementioned private managing company, issues a certificate.

Figure 1:
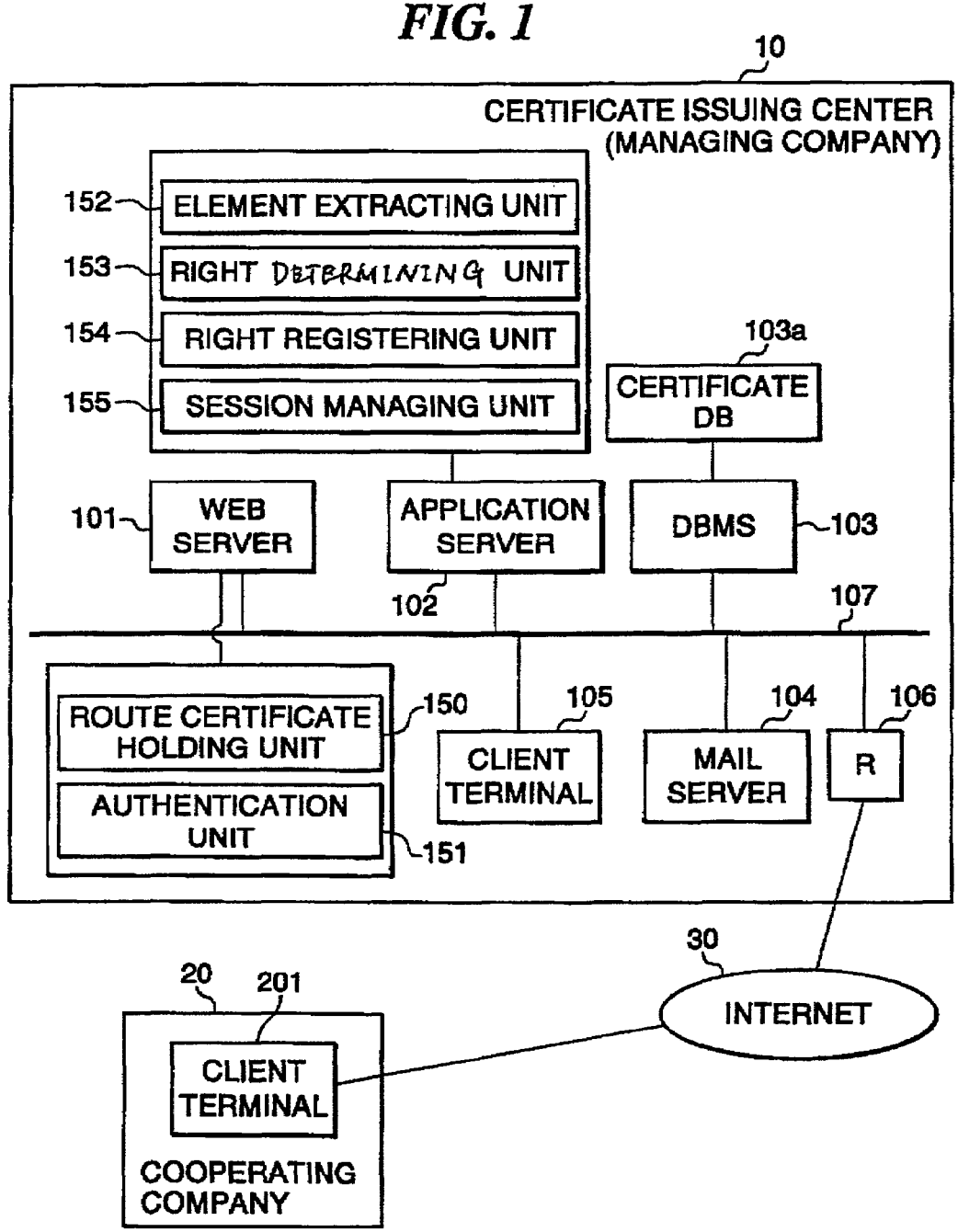
FIG. 1 is a system diagram showing an embodiment of the present invention.

FIG. 1 shows an information access system of this embodiment. In the figure, a certificate issuing center (a managing company site) 10 and a cooperating company site 20 are connected to the Internet 30. Here, for convenience sake, the certificate issuing center 10 is provided in a managing company. The cooperating company site 20 builds an intranet by a Local Area Network (LAN). A client terminal 201 is connected to the intranet.

Figure 2:
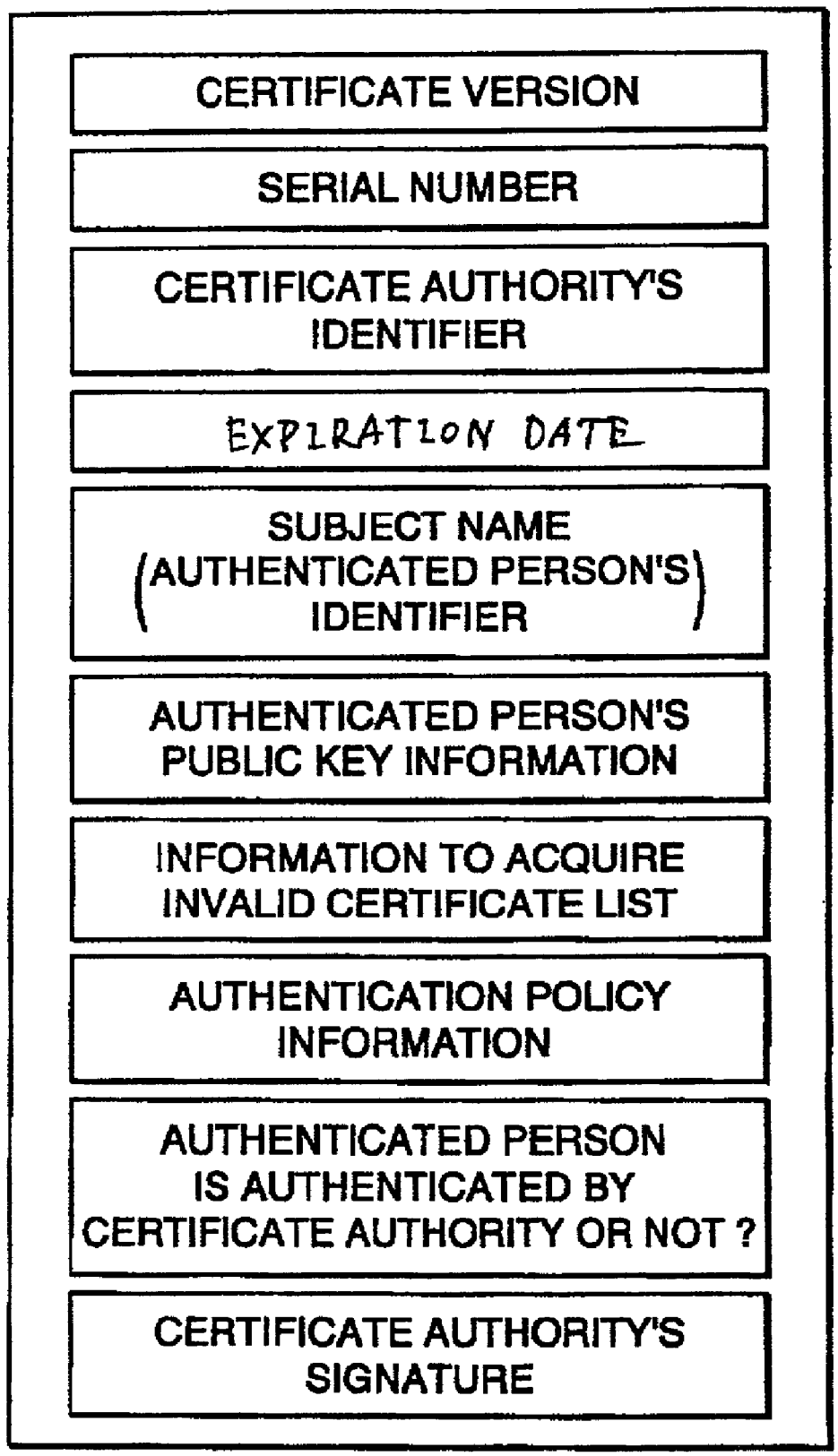
FIG. 2 is a diagram explaining a personal certificate used in the embodiment.

In this example, the certificate issuing center 10 receives an application for issuing a personal certificate from the client terminal 201 of the cooperating company site 20 and performs a process for issuing the personal certificate. The personal certificate conforms to the ITU-T recommendation X.509, which is as shown in FIG. 2.

The certificate issuing center 10 has a web server 101, an application server 102, a database management system 103, a mail server 104, a client terminal 105, and a router 106. These computer resources are connected to a LAN 107.

The web server 101 receives a request from the clients (the client terminals 201 and 105) in accordance with an HTTP (hypertext transfer protocol) protocol to transfer an HTML document (or an XML document) to the clients in reply to the request. The application server 102 executes various processes based on a program name and an argument sent from the client through the web server 101. In place of the application server 102, the CGI (Common Gateway Interface) program of the web server 101 may be used. The database management system 103 manages various databases associated with certificate issuing. The database is, e.g., a certificate database 103a.

A simplified example of certificate information held in the certificate database 103a managed by the database management system 103 is shown in FIG. 3. Here, before explaining the certificate information, DN (DistinguishedName, which is hereinafter called a subject name. See ITU-T Recommendation X.501) used in this example will be described. In this example, the subject name is defined by a country name (C), an organization name (O), a first organizational unit name (OU1), a second organizational unit name (OU2), a third organizational unit name (OU3), and a common name (CN). For an applicant other than the managing company, for example, "Partner" is described as OU1. For an employee of the managing company, OU1 is omitted or a predetermined department name is described as OU1. A project name is described for OU2. When not associated with the project, OU2 is omitted. The company name of the cooperating company is described for OU3. Of course, OU3 is omitted for a person in the managing company (an employee thereof). In this way, the project and the cooperating company can be described using the subject name. The suffix of OU corresponds to the attribute of OU. For example, OU1 representing a department in a company (or an organization outside the company) may employ a more hierarchical structure corresponding to the hierarchy of the department (or organization). Plural OU1s such as "personnel" (the personnel department) and "personnel1" (the first personnel department) can be defined.

The project means businesses or an activities managed together, and for convenience sake, it refers to business conducted between the managing company and other cooperating companies. The cooperating company is registered in relation to the project. A project conducted by the managing company alone or a non-business activity may also be handled as the "project". This makes it possible to issue a certificate independent of the organizational structure.

A specific example of the subject name will be described.

(1) SPECIFIC EXAMPLE 1

[C=JP, O=XYZ Co., CN=1234 Ryu Inada]

This example shows that the holder of the certificate is an employee of XYZ Co., the employee number is 1234, and his name is "Ryu Inada".

(2) SPECIFIC EXAMPLE 2

[C=JP, O=XYZ Co., OU=Partner, OU=Xnet, OU=ABC Co., CN=1234 001 Taro Fuji]

This example shows that the holder of the certificate is an employee of ABC Co. which is a cooperating company, and takes part in Project "Xnet", the operation purpose is procurement (001 of the common name means procurement), the employee number of the company to which he belongs is 1234, and his name is "Taro Fuji".

(3) SPECIFIC EXAMPLE 3

[C=JP, O=XYZ Co., OU=Partner, OU=Xnet, CN=1234 Hanako Fuji]

This example shows that the holder of the certificate is a temporary staff, the temporary staff number is 1234, and her name is "Hanako Fuji". She is judged to be a temporary staff since there is no cooperating company name or project name.

Now, getting back to explanation of FIG. 1, the certificate database 103a managed by the database management system 103 holds certificate information, as shown in FIG. 3. Referring to FIG. 3, the subject name is (C, O, OU1, OU2, OU3, CN), and the common name CN is, e.g., CN=12345 001 Taro Yamada. "12345" is a unique identifier, e.g., an employee number, in the cooperating company ABC. "001" is an ID showing the operation type in the managing company (for example, procurement or prototyping). "Taro Yamada" is the applicant's name. The certificate database 103a holds a certificate ID, a subject name (C, O, OU1, OU2, OU3, CN), and an expiration date. A certificate includes a subject name, an issuer's name, a public key, and an issuer's signature.

The web server 101, the application server 102, and the database management system 103 are used to implement functions for executing a specific process for issuing a certificate. The client can use various functions of the web-based certificate issuing system.

The mail server 104 executes an SMTP (Simple Mail Transfer Protocol) daemon and delivers e-mails.

The client terminal 105 includes a web browser and receives services in the certificate issuing center (the managing company) 10.

The client terminal 201 is a personal computer or a workstation placed in the cooperating company site 20 and a web browser is installed therein. The client terminal 201 accesses the certificate issuing system provided by the certificate issuing center 10 to perform model registration (company registration) application and personal certificate issuing application. Since the certificate issuing center 10 is released on the Internet 30, it is desirable to provide a security mechanism such as a firewall, as needed. The certificate issuing process itself is not directly related to the present invention, and the detailed description thereof is omitted. Naturally, a normal certificate issuing process can be employed.

An application for issuing a certificate is made to such a certificate issuing center 10, the application is approved, and then a certificate is issued. The applicant receives notification of a certificate ID, and inputs is on a relevant web site to acquire the certificate.

Access control using a certificate will be explained.

Figure 4:
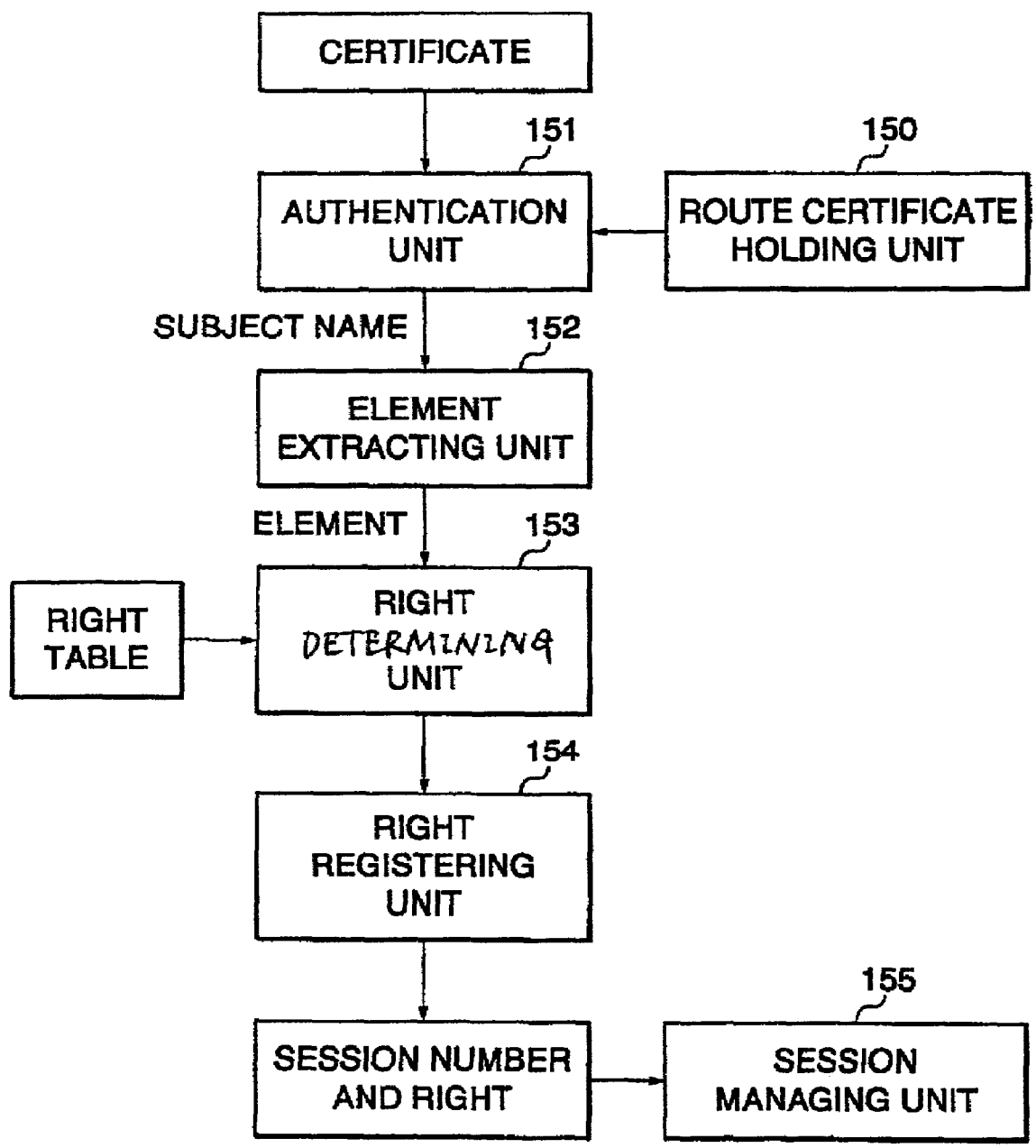
FIG. 4 is a block diagram schematically explaining control of an applicant's right in the embodiment.

FIG. 4 schematically shows a mechanism to perform access control. This mechanism is implemented by the web server 101 and the application server 102. The CGI program of the web server 101 or JavaServlet (trademark) can be used in place of the application server 102.

In FIG. 4, the access control mechanism includes a route certificate holding unit 150, an authentication unit 151, an element extracting unit 152, a right determining unit 153, a right registering unit 154, and a session managing unit 155. In this example, the web server 101 has the route certificate holding unit 150 and the authentication unit 151. The application server 102 has the element extracting unit 152, the right discriminating unit 153, the right registering unit 154, and the session managing unit 155.

Figure 5:
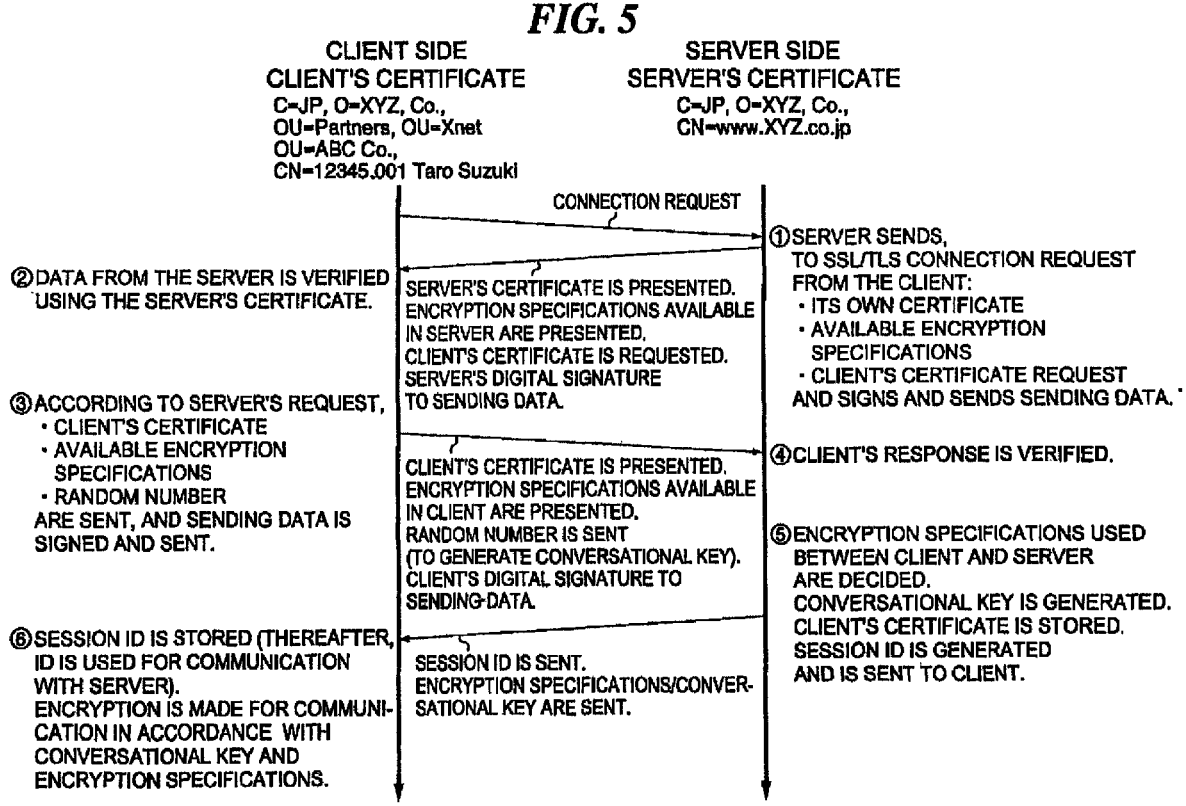
FIG. 5 is a diagram explaining an authentication procedure of the embodiment.

The authentication procedure of FIG. 5 is executed by the web server 101 when a normal SSL/TLS connection is requested. Since the procedure is apparent from the figure, the description thereof is omitted. The authentication unit 151 receives a certificate from the client terminal for executing the authentication procedure. The certificate is used for the authentication procedure shown in FIG. 5, and its subject name is supplied to the element extracting unit 152. The authentication unit 151 uses a public key of the route certificate held in the route certificate holding unit 150 to verify the signature of the certificate received from the client terminal (see FIG. 2). When the verification is failed, the connection is denied. When the verification is successful, a session number (alternatively, called a session ID) is allocated, and the session managing unit 155 of the application server 105 stores and manages a session number.

The element extracting unit 152 follows the hierarchy structure of the subject name to extract a predetermined element. In this example, when OU1 is "Partner" and OU3 has a company name, the project name for OU2, the company name for OU3, the operation type code for CN (e.g., "001") are extracted.

Figure 6:
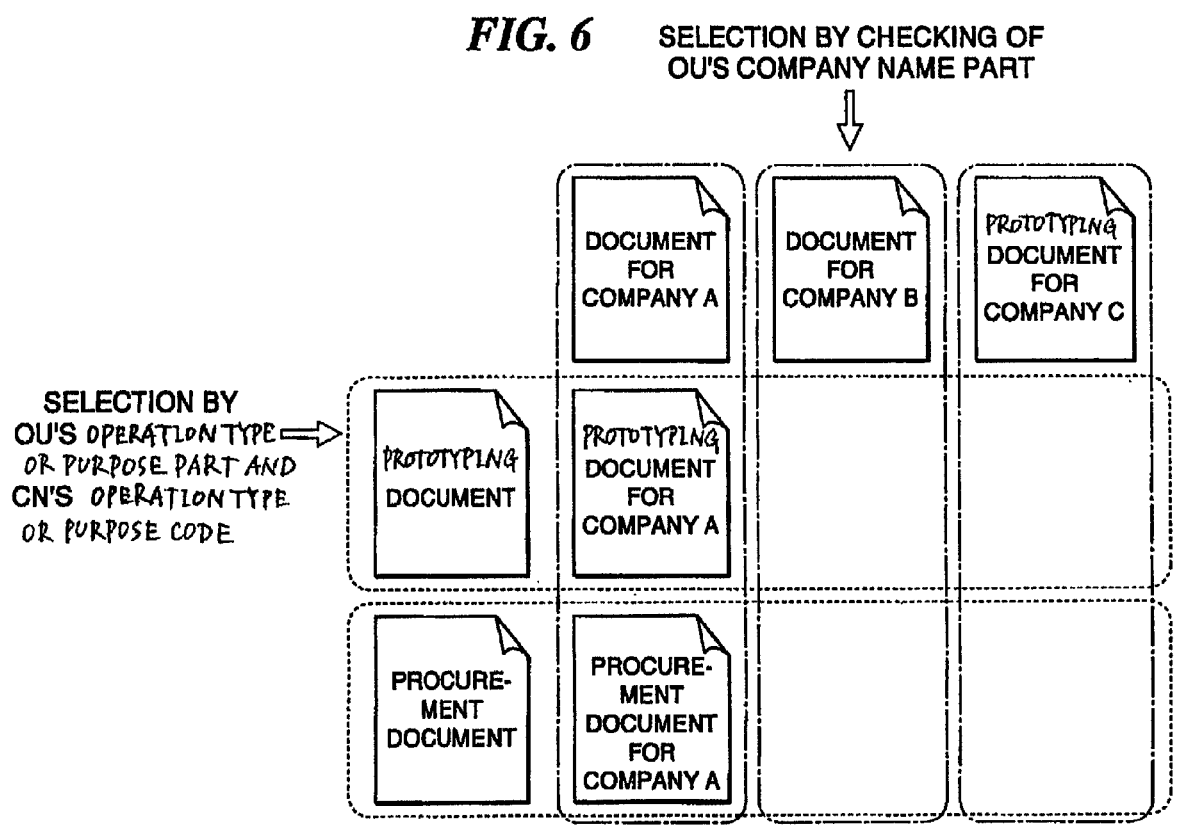
FIG. 6 is a diagram explaining access right distinction in the embodiment.

The right determining unit 153 determines an access right for accessing a document in accordance with distinctions as shown in FIG. 6 and allocates the right to the session number. The distinctions as shown in FIG. 6 can be installed as a table as shown in FIG. 7 and the right determining unit 153 refers to the table to determine the accessible file or directory. The right registering unit 154 registers the relation between the session number and the access right (the right level or the accessible file name/directory name) into the session managing unit 155. For example, the relation is registered into the database, not shown, of the session managing unit 155, as shown in FIG. 8. While the session continues, the access right is allowed based on the session number.

The abovementioned authentication procedure and access right control are available not only between the client terminal and the web server 101 of the certificate issuing center (the managing company site) 10, but also between the client terminal and other web servers. The same authentication procedure and access right control can be executed between the client terminal and other various web servers.

Figure 9:
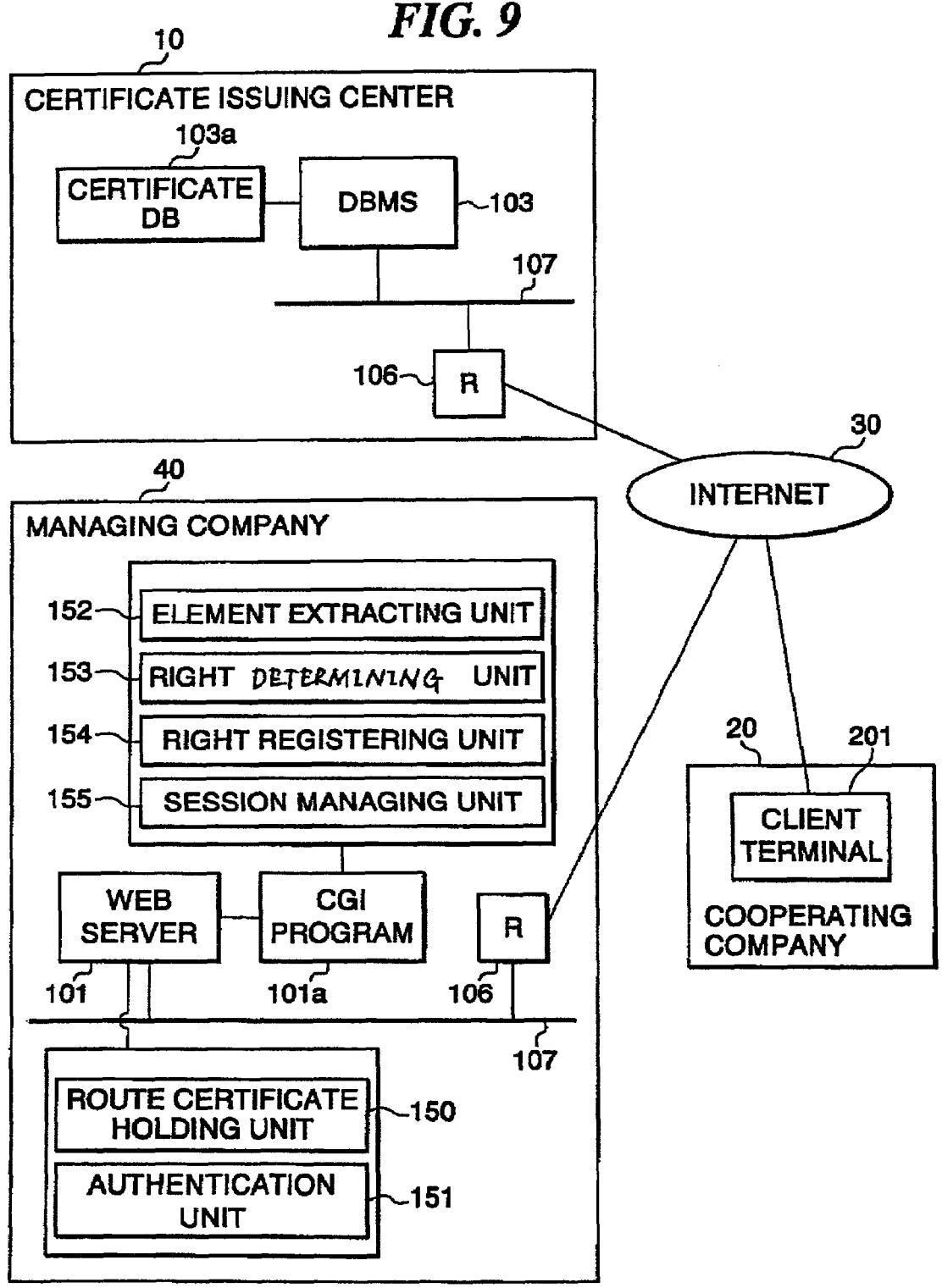
FIG. 9 is a diagram explaining a modification of the embodiment.

In the above embodiment, the certificate issuing center 10 is provided in the managing company site. As shown in FIG. 9, the certificate issuing center 10 and a managing company site 40 may be separately provided. In the example shown in FIG. 9, a certificate issuing function is allocated to the certificate issuing center 10, and a function to perform a web-based service is provided in the managing company site 40. The access right control same as described above is executed by the web server 101 for any access to the managing company site 40. In the example of FIG. 9, the web server 101 itself has the authentication unit 151 and the route certificate holding unit 150. The CGI program of the web server 101 has the element extracting unit 152, the right discriminating unit 153, the right registering unit 154, and the session managing unit 155. JavaServlet may be used in place of the CGI program. The application server as shown in FIG. 1 may also be used.

In FIG. 9, parts corresponding to those in FIG. 1 are indicated by the same reference numerals, and the description thereof is not repeated.

In the above description, an environment in which the managing company and the cooperating company cooperatively perform a project has been taken as an example. The access right control of an arbitrary pattern between a server and a client can be performed likewise.

As described above, the present invention can easily determine the right or properties of a holder of a personal certificate using the subject name in the certificate and can simply perform the access control.

In other words, information on an access limitation which has been managed by a directory service server (a database server) is embedded into a subject name as a part of its organizational unit name or common name, and can be used after the legitimacy of the contents thereof is checked by the certificate signature. Thereby the information on the access limitation can be supplied to the server without using the directory server. The server side simply holds the table describing the relation between the information and the right embedded into the subject name and easily recognizes the access right.

As a result, the disadvantage of the conventional system which uses a directory server to impose an access limitation can be solved. In other words, a subject name and a right level will not be transmitted through the network (e.g., the Internet), and the copy of the directory server is not required to be placed on the site of each of the servers.

The present invention is not limited to the above embodiment, and various changes can be done in the range without deviating from the purpose. For example, in the above embodiment, an operation type code is included in the common name, but may be included in the organizational unit name of a predetermined hierarchy. It is apparent that the subject name configuration of the present invention can be used in an application other than access control.

As described above, the present invention can easily perform access control using a personal certificate.

The entire disclosure of Japanese Patent Application No. 2001-315276 filed on Oct. 12, 2001 including specification, claims, drawings and abstract is incorporated herein by reference in its entirety.

What is claimed is:

1. An apparatus for processing a subject name included in a personal certificate, comprising:
   a receiving part that receives a personal certificate associated with an individual user;
   a verifying part that verifies the received personal certificate based on a digital signature technique;
   an extracting part that extracts at least one of a plurality of predetermined elements in a subject name included in the received personal certificate; and
   a determining part that determines an access right of the individual user based on a value of the extracted at least one of the plurality of predetermined elements,
   wherein the plurality of predetermined elements includes at least one element allocated for representing a project, and because the access right is determined based on the extracted element value, accessing a database or a directory service to determine the access right is unnecessary.

2. The apparatus for processing a subject name included in a personal certificate according to claim 1, wherein the at least one of the plurality of predetermined elements is an organizational unit name of a predetermined hierarchy of the subject name.

3. The apparatus according to claim 1, wherein the plurality of predetermined elements further includes at least one element allocated for representing a purpose of operation to be operated by the individual user.

4. A web server computer system, comprising:
   a receiving part that receives a personal certificate associated with an individual user;
   a verifying part that verifies the received personal certificate based on a digital signature technique;
   an extracting part that extracts at least one of a plurality of predetermined elements in a subject name included in the received personal certificate; and
   a determining part that determines an access right of the individual user based on a value of the extracted at least one of the plurality of predetermined elements,
   wherein the plurality of predetermined elements includes an element allocated for representing a project, and because the access right is determined based on the extracted element value, accessing a database or a directory service to determine the access right is unnecessary.

5. The web server computer system according to claim 4, wherein the plurality of predetermined elements further includes at least one element allocated for representing a purpose of operation to be operated by the individual user.

6. A web server computer system, comprising:
   a receiving part that receives a personal certificate associated with an individual user;
   a verifying part that verifies the received personal certificate based on a digital signature technique;
   an allocating part that allocates a session identifier when the received personal certificate is successfully verified;
   an extracting part that extracts at least one of a plurality of predetermined elements in a subject name included in the received personal certificate;
   a determining part that determines an access right of the individual user based on a value of the extracted at least one of the plurality of predetermined elements; and
   a memory that stores the determined access right of the individual user associated with the session identifier,
   wherein the plurality of predetermined elements includes an element allocated for representing a project, and because the access right is determined based on the extracted element value, accessing a database or a directory service to determine the access right is unnecessary.

7. The web server computer system according to claim 6, wherein the at least one of the plurality of predetermined elements is an organizational unit name of a predetermined hierarchy of the subject name.

8. The web server computer system according to claim 6, wherein the plurality of predetermined elements further includes at least one element allocated for representing a purpose of operation to be operated by the individual user.

9. An apparatus for processing a subject name included in a personal certificate, the apparatus comprising:
   a receiving part that receives a personal associated with an individual user;
   an extracting part that extracts at least one of a plurality of predetermined elements in a subject name included in the received personal certificate; and
   a determining part that determines an access right of the individual user based on a value of the extracted at least one of the plurality of predetermined elements, the extracted at least one of the plurality of predetermined elements being an organizational unit name of an organization of which the individual user is a member and an attribute other than a personal ID,
   wherein because the access right is determined based on the extracted element value, accessing a database or a directory service to determine the access right is unnecessary.

10. The apparatus for processing a subject name included in a personal certificate according to claim 9, wherein the organizational unit name indicates that the individual user is not a member of the organization represented by the organizational unit name and that the individual user cooperates with the organization.

11. The apparatus for processing a subject name included in a personal certificate according to claim 9, wherein the organizational unit name represents a project name in which the individual user takes part.

12. The apparatus according to claim 9, wherein the plurality of predetermined elements further includes at least one element allocated for representing a purpose of operation to be operated by the individual user.

13. The apparatus for processing a subject name included in a personal certificate according to claim 9, wherein the organizational unit name represents a cooperating organization name which cooperates with the organization represented by the organizational unit name and of which the individual user is a member.

14. A method for processing a subject name included in a personal certificate, comprising:
receiving a personal certificate associated with an individual user;
verifying the received personal certificate based on a digital signature technique;
extracting at least one of a plurality of predetermined elements in a subject name included in the received personal certificate; and
determining an access right of the individual user based on a value of the extracted at least one of the plurality of predetermined elements,
wherein the plurality of predetermined elements includes an element allocated for representing a project, and because the access right is determined based on the extracted element value, accessing a database or a directory service to determine the access right is unnecessary.

15. The method of claim 14, wherein the plurality of predetermined elements further includes at least one element allocated for representing a purpose of operation to be operated by the individual user.

16. A method for processing a subject name included in a personal certificate, the method comprising:
receiving a personal certificate associated with an individual user;
extracting at least one of a plurality of predetermined elements in a subject name included in the received personal certificate; and
determining an access right of the individual user based on a value of the extracted at least one of the plurality of predetermined elements, the extracted at least one of the plurality of predetermined elements being an organizational unit name of an organization of which the individual user is a member and an attribute other than a personal ID,
wherein because the access right is determined based on the extracted element value, accessing a database or a directory service to determine the access right is unnecessary.

17. The method of claim 16, wherein the plurality of predetermined elements further includes at least one element allocated for representing a purpose of operation to be operated by the individual user.

18. A storage medium readable by a computer, the storage medium storing a program of instructions executable by the computer to perform a function for processing a subject name included in a personal certificate, the function comprising:
receiving a personal certificate associated with an individual user;
verifying the received personal certificate based on a digital signature technique;
extracting at least one of a plurality of predetermined elements in a subject name included in the received personal certificate; and
determining an access right of the individual user based on a value the extracted at least one of the plurality of predetermined elements,
wherein the plurality of predetermined elements includes an element allocated for representing a project, and because the access right is determined based on the extracted element value, accessing a database or a directory service to determine the access right is unnecessary.

19. The storage medium of claim 18, wherein the plurality of predetermined elements further includes at least one element allocated for representing a purpose of operation to be operated by the individual user.

20. A storage medium readable by a computer, the storage medium storing a program of instructions executable by the computer to perform a function for processing a subject name included in a personal certificate, the function comprising:
receiving the personal certificate associated with an individual user;
extracting at least one of a plurality of predetermined elements in a subject name included in the received personal certificate; and
determining an access right of the individual user based on a value of the extracted at least one of the plurality of predetermined elements, the extracted at least one of the plurality of predetermined elements being an organizational unit name of an organization of which the individual user is a member and an attribute other than a personal ID,
wherein because the access right is determined based on the extracted element value, accessing a database or a directory service to determine the access right is unnecessary.

21. The storage medium for storing a program of instructions of claim 20, wherein the plurality of predetermined elements further includes at least one element allocated for representing a purpose of operation to be operated by the individual user.

22. An apparatus for processing a subject name included in a personal certificate, comprising:
a receiving part that receives a personal certificate associated with an individual user;
a verifying part that verifies the received personal certificate based on a digital signature technique;
an extracting part that extracts at least one of a plurality of predetermined elements in a hierarchy of a subject name included in the received personal certificate; and
a determining part that determines an access right of the individual user based on a value of the extracted at least one of the plurality of predetermined elements,
wherein the plurality of predetermined elements includes an organizational unit name allocated for representing a project name and a common name allocated for representing a purpose of operation of the project, and because the access right is determined based on the extracted element value, accessing a database or a directory service to determine the access right is unnecessary.

* * * * *